(12) United States Patent
Morris et al.

(10) Patent No.: US 9,820,899 B1
(45) Date of Patent: Nov. 21, 2017

(54) FOLD OUT RAMP

(71) Applicants: Donald Morris, Littleton, CO (US); David Johnson, Modesto, CA (US)

(72) Inventors: Donald Morris, Littleton, CO (US); David Johnson, Modesto, CA (US)

(73) Assignee: LIFT-U, DIVISION OF HOGAN MFG., INC., Escalon, CA (US)

( * ) Notice: Subject to any disclaimer, the term of this patent is extended or adjusted under 35 U.S.C. 154(b) by 0 days.

(21) Appl. No.: 14/069,264

(22) Filed: Oct. 31, 2013

(51) Int. Cl.
*B60P 1/00* (2006.01)
*A61G 3/06* (2006.01)
*B60P 1/43* (2006.01)
*E01D 15/12* (2006.01)

(52) U.S. Cl.
CPC ............... *A61G 3/061* (2013.01); *B60P 1/43* (2013.01); *E01D 15/124* (2013.01)

(58) Field of Classification Search
CPC ........................................................ B60P 1/43
See application file for complete search history.

(56) References Cited

U.S. PATENT DOCUMENTS

2011/0008140 A1* 1/2011 Hansen et al. ................. 414/523
2011/0268544 A1 11/2011 Koretsky

* cited by examiner

*Primary Examiner* — Saul Rodriguez
*Assistant Examiner* — Willie Berry, Jr.
(74) *Attorney, Agent, or Firm* — Christensen O'Connor Johnson; Matthew Balint

(57) ABSTRACT

A method is disclosed for deploying a ramp assembly. The ramp assembly includes a ramp portion rotatable between a stowed position and a deployed position. The ramp assembly further includes a panel rotatable about a first end, wherein the ramp portion supportingly engages a second end of the panel to elevate the second end of the panel as the ramp portion moves toward the deployed position. The method includes the step of rotating the ramp portion until the ramp portion contacts an alighting surface. The method further includes the step of rotating the ramp portion until one of a first condition and second condition occurs. The first condition is that the ramp portion has reached a maximum slope. The second condition is that the second end of the panel has reached a predetermined elevation.

6 Claims, 16 Drawing Sheets

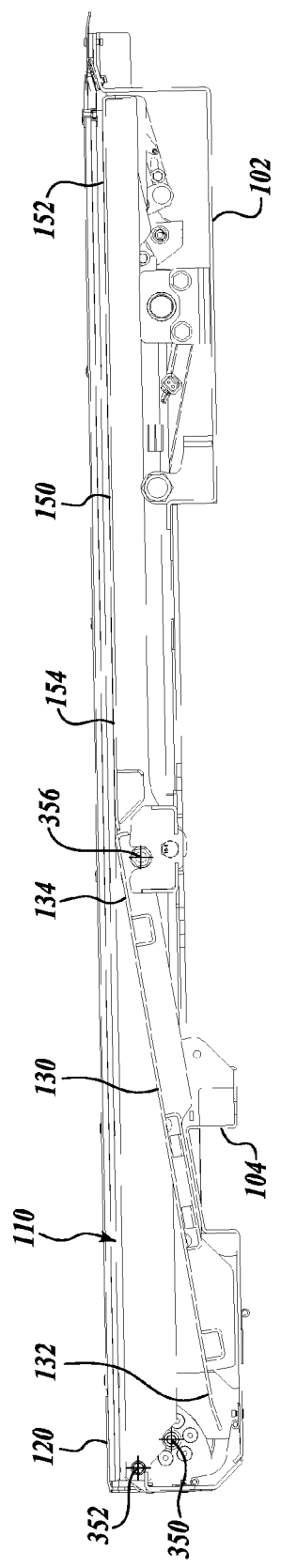

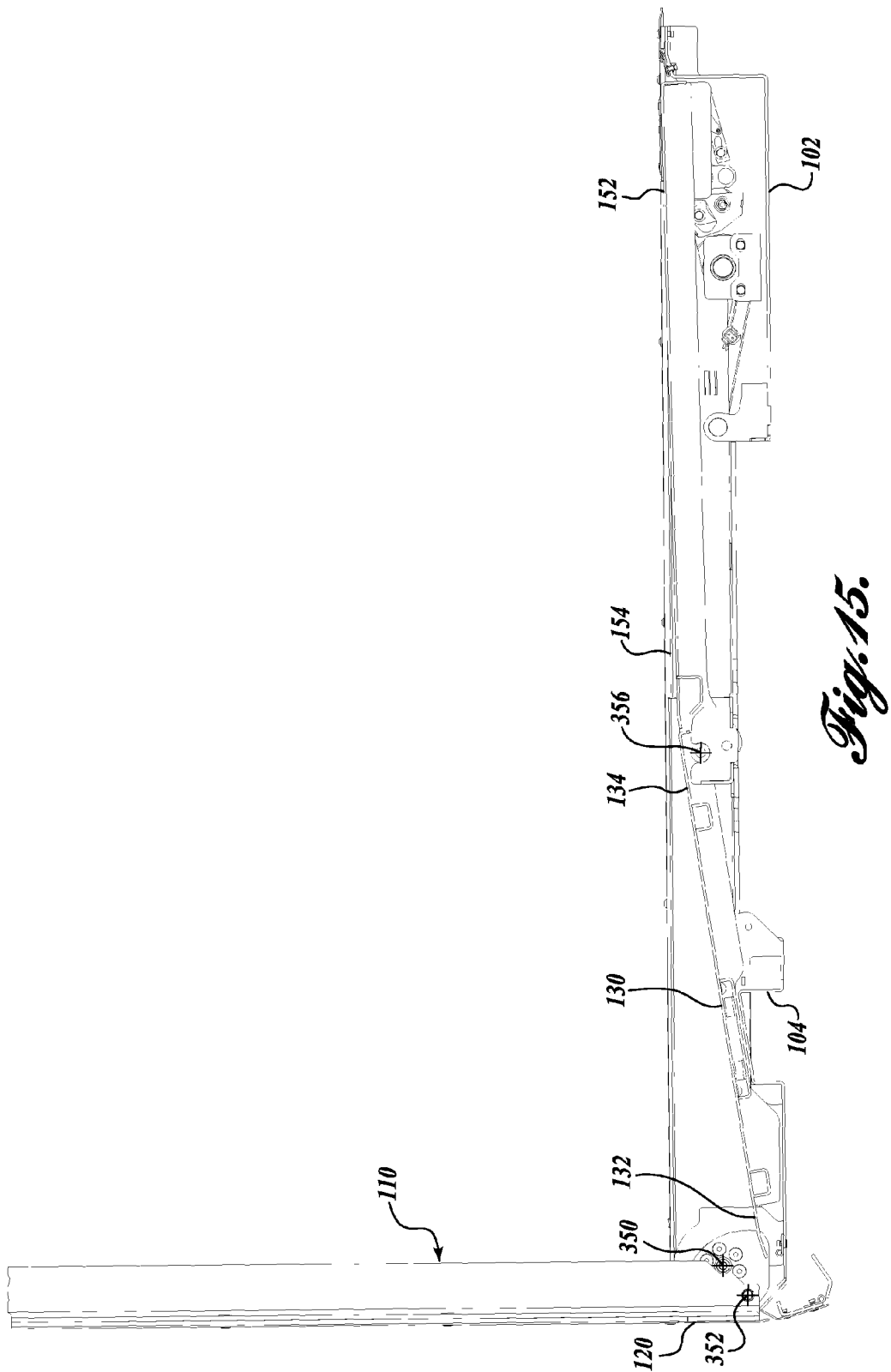

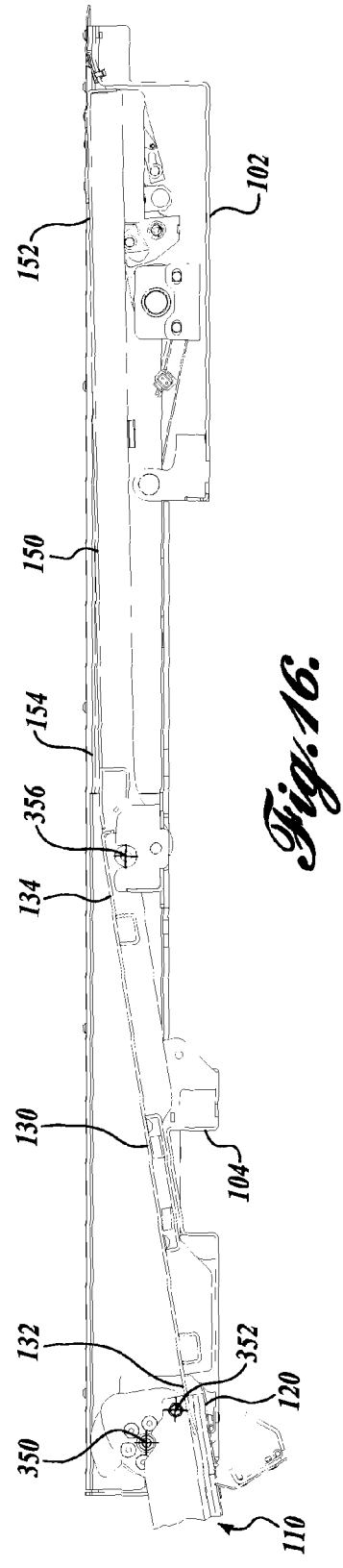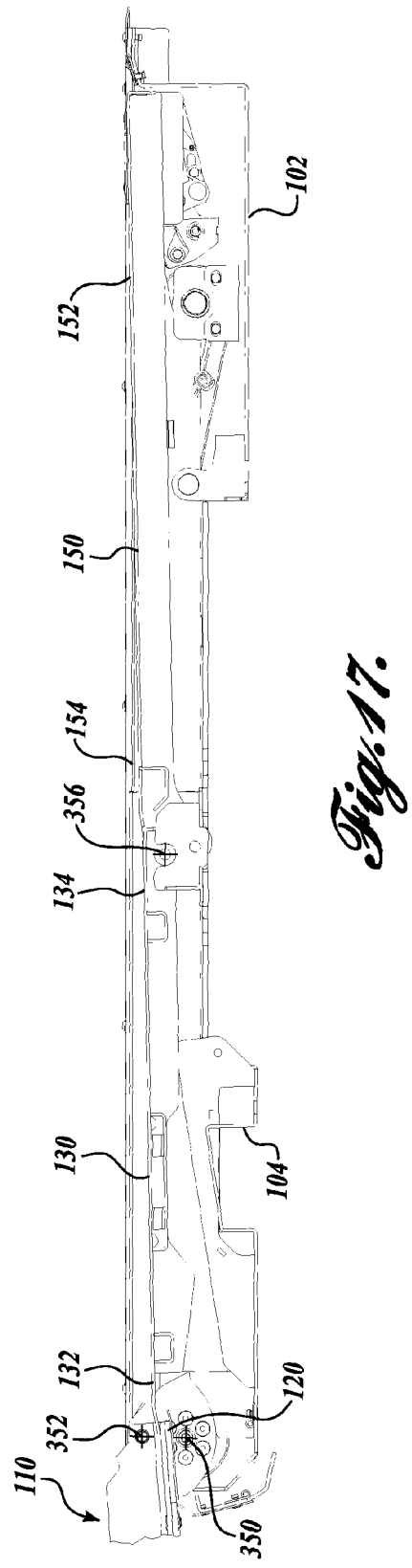

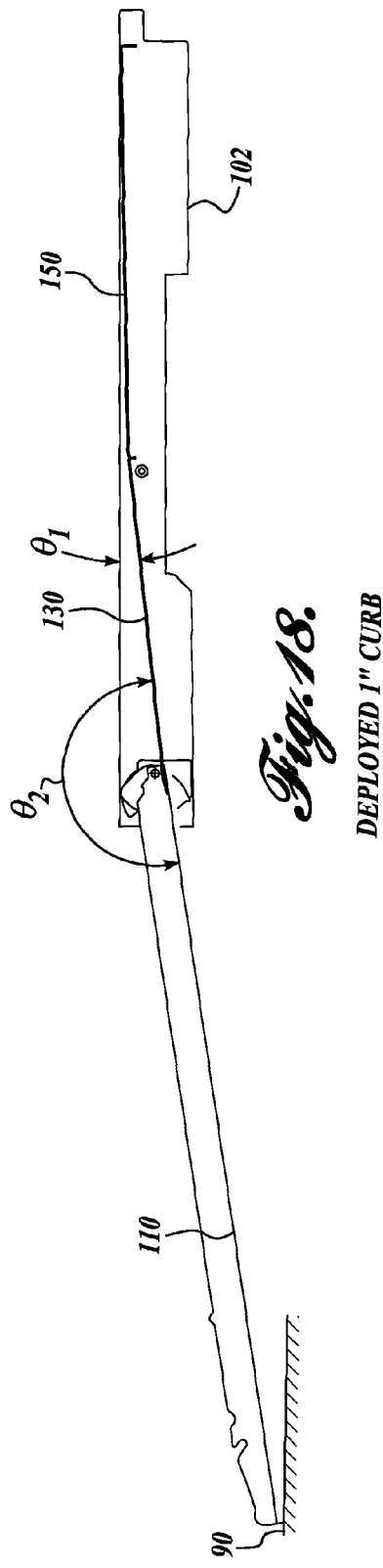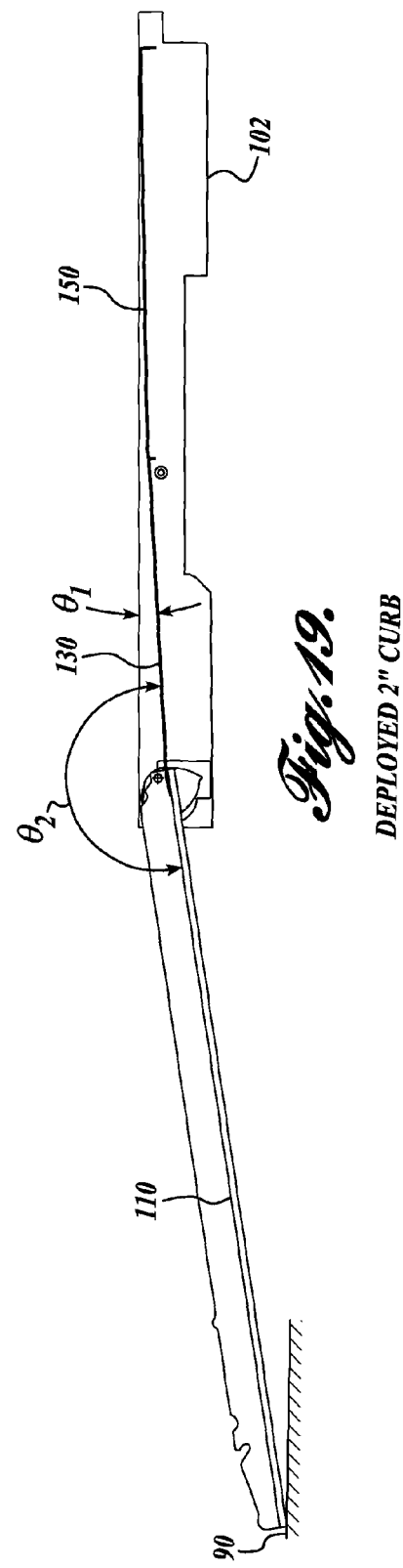

DEPLOYED 6" CURB

DEPLOYED 9" CURB

FOLD OUT RAMP

FIELD OF THE INVENTION

The present invention relates generally to wheelchair ramps and, more particularly, to a fold out ramp for a vehicle.

BACKGROUND OF THE INVENTION

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that enable physically challenged people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and pivot about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to account for various curb heights.

Fold out ramps on vehicles confront a variety of technical problems. One such technical issue arises from the variety of situations in which the ramps must operate. Depending on the use of the vehicle in which a particular ramp is installed, the ramp might be deployed to curbs of varying heights, as well as to a road surface. In addition, road crown, the inclusion of a "kneeling" feature on the vehicle, and other factors can affect the height of the vehicle floor relative to the alighting surface. Thus, the vertical distance through which a ramp must provide a transition surface can vary significantly.

One attempt to provide a longer ramp surface to reduce the ramp angle in a variety of situations is disclosed in U.S. Patent Publication No. 2011/0268544 ("the '544 publication"), by Koretsky et al., which published on Nov. 3, 2011, the entire disclosure of which is incorporated herein by reference. The '544 publication discloses a ramp assembly that includes a self-aligning platform mechanism. The platform mechanism includes a deploying mechanism connected between a hinged platform and a ramp. The mechanism automatically aligns the ramp with the platform to assure the same angle of both components in relation to the ground surface for a low floor vehicle access ramp regardless of the height of the vehicle floor and the pivot axis of the ramp, with respect to the ground surface or curb. To ensure that the platform and the ramp deploy to the same angle in relation to the ground surface, the ramp assembly has a switch disposed on the ramp. When the ramp reaches an aligned position with respect to the platform, i.e., when the ramp surface is parallel to the platform surface, the switch is actuated to stop the motor of the drive system.

While certain advantages are provided by ensuring that the ramp surface aligns with the platform surface when the ramp assembly is deployed, such a configuration also presents disadvantages. Some such disadvantages arise from the typical placement of a ramp assembly in a bus.

Ramp assemblies such as the one disclosed in the '544 publication are commonly installed at the front of a bus so that the ramp extends laterally toward the curb to provide a sloped transition surface between the interior of the bus and an alighting surface, such as a curb. To enter the bus, a disabled passenger travels up the inclined surface and then turns at the top of the ramp into the aisle of the vehicle. To exit the bus, the disabled passenger moves up the aisle until aligned with the ramp and then turns toward the curb and exits down the inclined surface. Passengers entering or exiting a bus will often "cut the corner" between the inclined surface and the vehicle aisle. That is, a passenger entering the bus may start to turn into the vehicle aisle while still positioned on the inclined surface. Similarly, a passenger exiting the bus may turn toward the curb before he or she is far enough forward in the aisle. In both cases, the drop off formed between the vehicle floor and side of the inclined surface of the deployed ramp assembly presents an obstacle to the passenger. For a passenger entering the bus, prematurely turning into the vehicle aisle requires the passenger to navigate up and over the lip, which can cause difficulty for passengers in wheelchairs, using walkers, or with otherwise limited mobility. For a passenger exiting the bus, prematurely turning onto the inclined surface can cause the passenger to drop off of the vehicle floor onto the inclined surface.

In view of the noted disadvantages that can accompany ramp assemblies like the one disclosed in the '544 publication, it would be advantageous to minimize the slope of the roadside portion of the deployed ramp assembly, while keeping the curbside portion of the deployed ramp assembly below a predetermined maximum slope. Minimizing the slope of the roadside portion of the deployed ramp assembly reduces the height of the drop off formed between the vehicle floor and the inclined surface, while keeping the curbside portion of the deployed ramp assembly below a predetermined maximum slope makes the ramp easier to navigate.

SUMMARY

A method is disclosed for deploying a ramp assembly, wherein the ramp assembly includes a ramp portion rotatable between a stowed position and a deployed position. The ramp assembly also includes a panel rotatable about a first end. The ramp portion supportingly engages a second end of the panel to elevate the second end of the panel as the ramp portion moves toward the deployed position. The method includes the step of rotating the ramp portion until the ramp portion contacts an alighting surface. The method also includes the step of rotating the ramp portion until one of a first condition and second condition occurs. The first condition is that the ramp portion has reached a predefined maximum slope. The second condition is that the second end of the panel has reached a predetermined elevation.

Also disclosed is an exemplary embodiment of a ramp assembly for providing a transition surface from a vehicle floor to an alighting surface. The ramp assembly has a ramp portion coupled for reciprocating movement between a stowed position and a deployed position. A bearing element is included on the ramp portion. A support element is rotatable about a first axis, and the ramp portion is rotatably coupled to the support element about a second axis. Rotation of the support element moves the second axis along an arcuate path. A cam surface is fixedly positioned relative to the stowed position of the ramp portion. The ramp assembly further includes a panel that is rotatable about a first end. A second end of the panel is supported by the ramp portion such that rotation of the ramp portion toward the deployed position raises the second end of the panel. An actuator is operably coupled to the support element to rotate the support element about the first axis. The actuator is controlled by a controller to selectively rotate the support element.

Rotation of the support element drives the ramp portion through a first phase, a second phase, and a third phase of a deployment motion. During the first phase, the cam surface supportingly engages the bearing element. The support element supportingly engages the bearing element during the second phase. During the third phase, the second axis moves in an upward direction. The third phase ends when either (1) the ramp portion reaches a predetermined maximum slope, or (2) the second end of the panel reaches a maximum elevation.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 14 is a side cross-sectional view of the ramp assembly of FIG. 1, with the ramp portion in the stowed position;

FIG. 15 is a partial, side cross-sectional view of the ramp assembly of FIG. 14, with the ramp portion in the neutral position;

FIG. 16 is a partial, side cross-sectional view of the ramp assembly of FIG. 14, with the ramp portion in the first deployed position;

FIG. 17 is a partial, side cross-sectional view of the ramp assembly of FIG. 14, with the ramp portion in the second deployed position;

FIG. 18 is a side cross-sectional view of the ramp assembly of FIG. 1, with the ramp portion deployed to a first alighting surface;

FIG. 19 is a side cross-sectional view of the ramp assembly of FIG. 18, with the ramp portion deployed to a second alighting surface;

DETAILED DESCRIPTION

Exemplary embodiments of the disclosed fold out ramp will now be described with reference to the accompanying drawings, where like numerals correspond to like elements. The described embodiments are directed to ramp assemblies, and more specifically, wheelchair ramp assemblies. In particular, several embodiments are directed to wheelchair ramp assemblies suitable for use in buses, vans, etc. Several embodiments of the present invention are directed to compact ramp assemblies for a vehicle that, when stowed, occupy a small amount of space within the vehicle floor, yet deploy to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the disclosed subject matter, as claimed. Thus, it will be apparent to one skilled in the art that aspects of the disclosed fold out ramp may be employed with other ramp assemblies used in stationary installations, such as residential buildings and the like. The following detailed description may use illustrative terms such as vertical, horizontal, front, rear, curbside (outboard), roadside (inboard), inner, proximal, distal, etc.; however, these terms are descriptive in nature and should not be construed as limiting. Further, it will be appreciated that various embodiments of the disclosed fold out ramp may employ any combination of features described herein.

Figure 4:
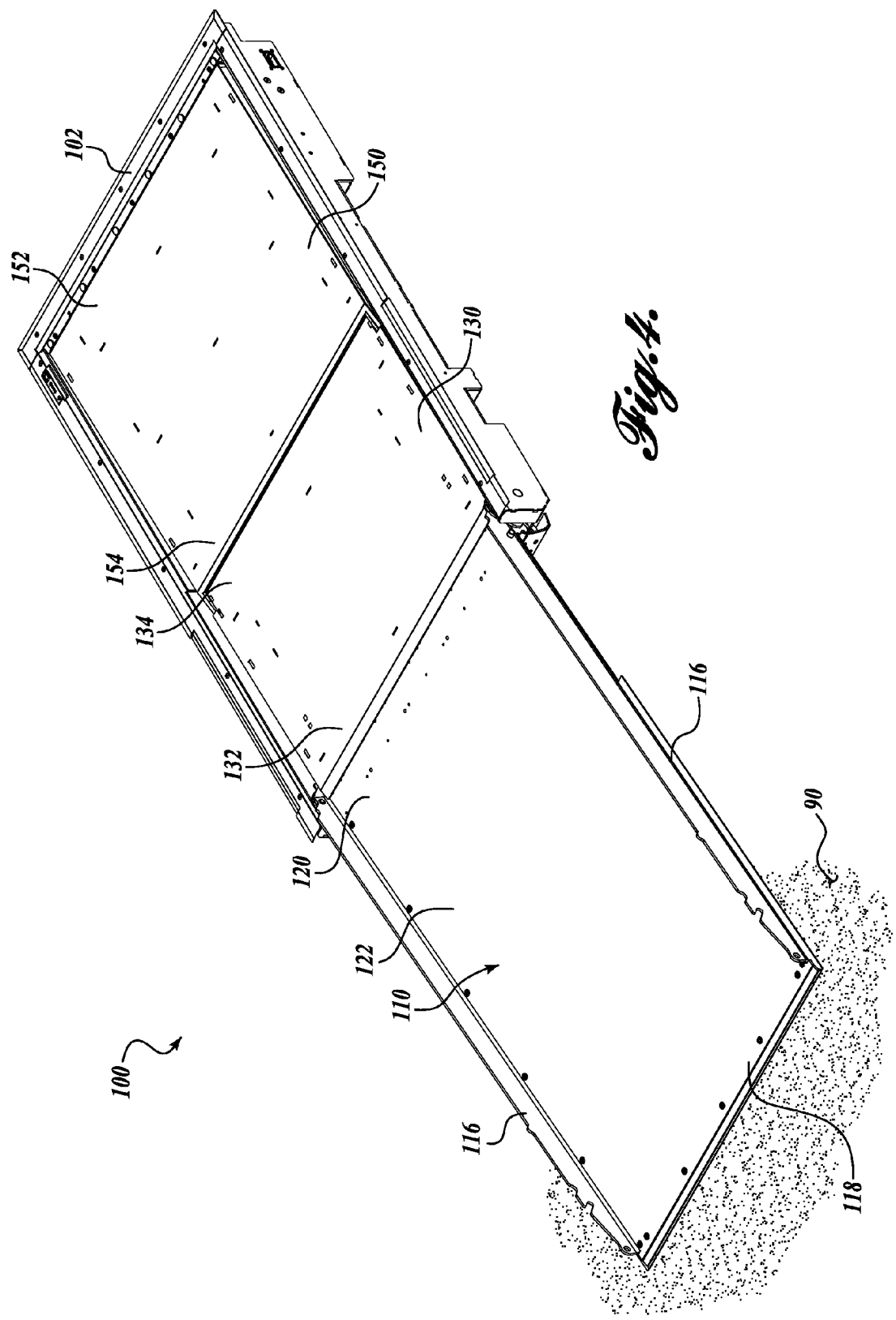
FIG. 4 is an isometric view of the ramp assembly shown in FIG. 1, with the ramp portion in a second deployed position.

FIGS. 1-4 illustrate one exemplary embodiment of a fold out ramp assembly 100 (hereinafter "ramp assembly 100") as it moves from a stowed position (FIG. 1) through a neutral position (FIG. 2) and a first deployed position (FIG. 3) to a second deployed position (FIG. 4). The ramp assembly 100 includes a frame 102, a ramp portion 110, an intermediate panel 130, and an inner panel 150. The frame 102 of the ramp assembly 100 is adapted to be mounted to a vehicle (not shown) having a floor, such as a bus or a van. The ramp assembly 100 is reciprocal between the stowed position, shown in FIG. 1, and various deployed positions, such as the ones shown in FIGS. 3 and 4.

Although the illustrated embodiments of the ramp assembly 100 include a frame 102, other embodiments are contemplated in which the ramp assembly 100 does not include a frame. To install such embodiments in vehicles, the ramp assembly 100 components can be attached directly to the structure of the vehicle or to a suitable structure within the vehicle, thus making a frame 102 unnecessary. Similarly, when such embodiments are installed in stationary installations, such as residential buildings and the like, the ramp assembly 100 components can be attached to the structure of the building or any other suitable structure within the building. Accordingly, embodiments of the described ramp assembly 100 that do not include a frame, should be considered within the scope of the present disclosure.

Still referring to FIGS. 1-4, the ramp portion 110 includes a panel 114 constructed from well-known materials. The ramp portion 110 further includes side curbs 116 that extend upwardly from the forward and rear sides of the panel 114. The side curbs 116 increase the strength of the ramp portion 110 and provide edge guards for the sides of the ramp portion 110, thereby increasing the overall safety of the ramp assembly 100. In the illustrated embodiment, the curbside end 118 of the ramp portion 110 (when the ramp is in a deployed position) is tapered to provide a smooth transition between the panel 114 and the alighting surface 90 when the ramp assembly 100 is in a deployed position, although such a feature may not be necessary, depending on the thickness of the panel.

Figure 1:
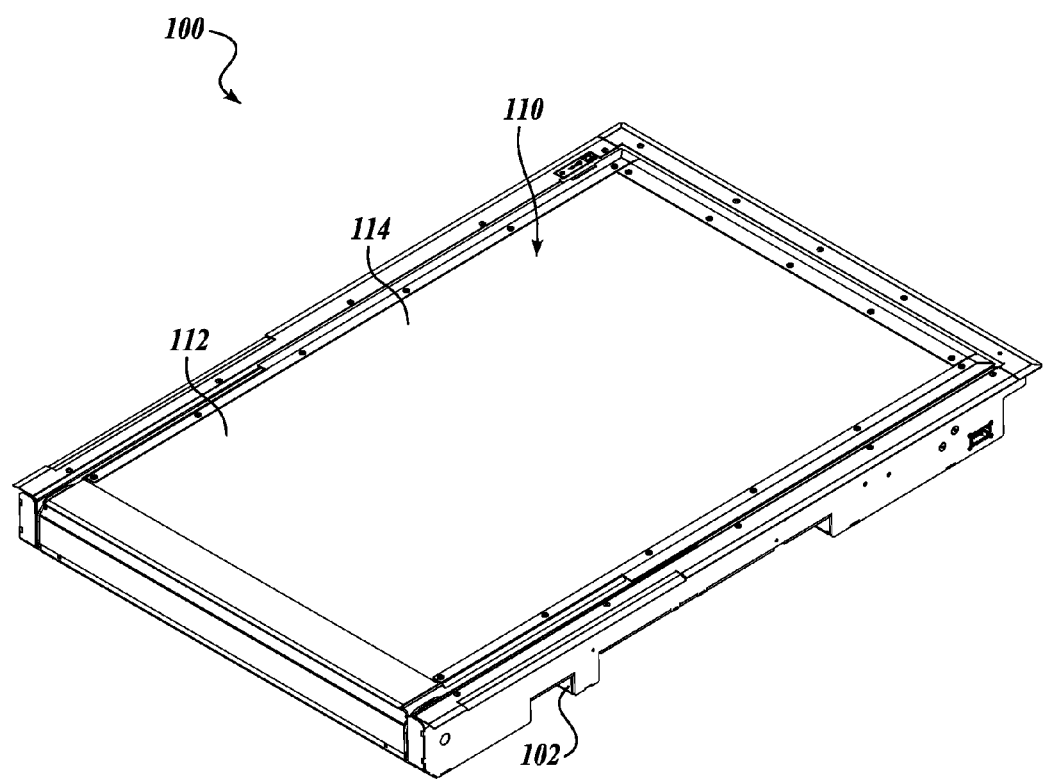
FIG. 1 is an isometric view of an exemplary embodiment of a ramp assembly with a ramp portion in the stowed position.
Figure 2:
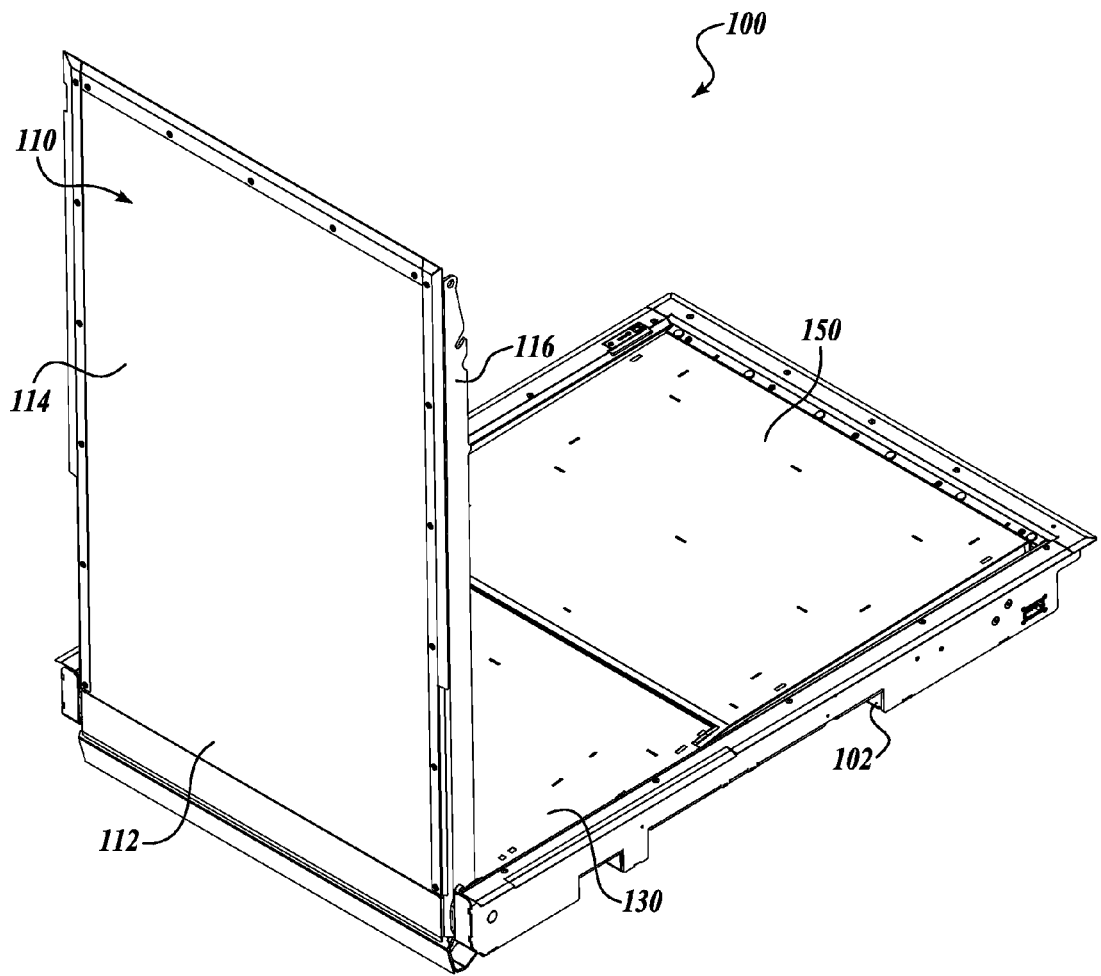
FIG. 2 is an isometric view of the ramp assembly shown in FIG. 1, with the ramp portion in a neutral position.
Figure 3:
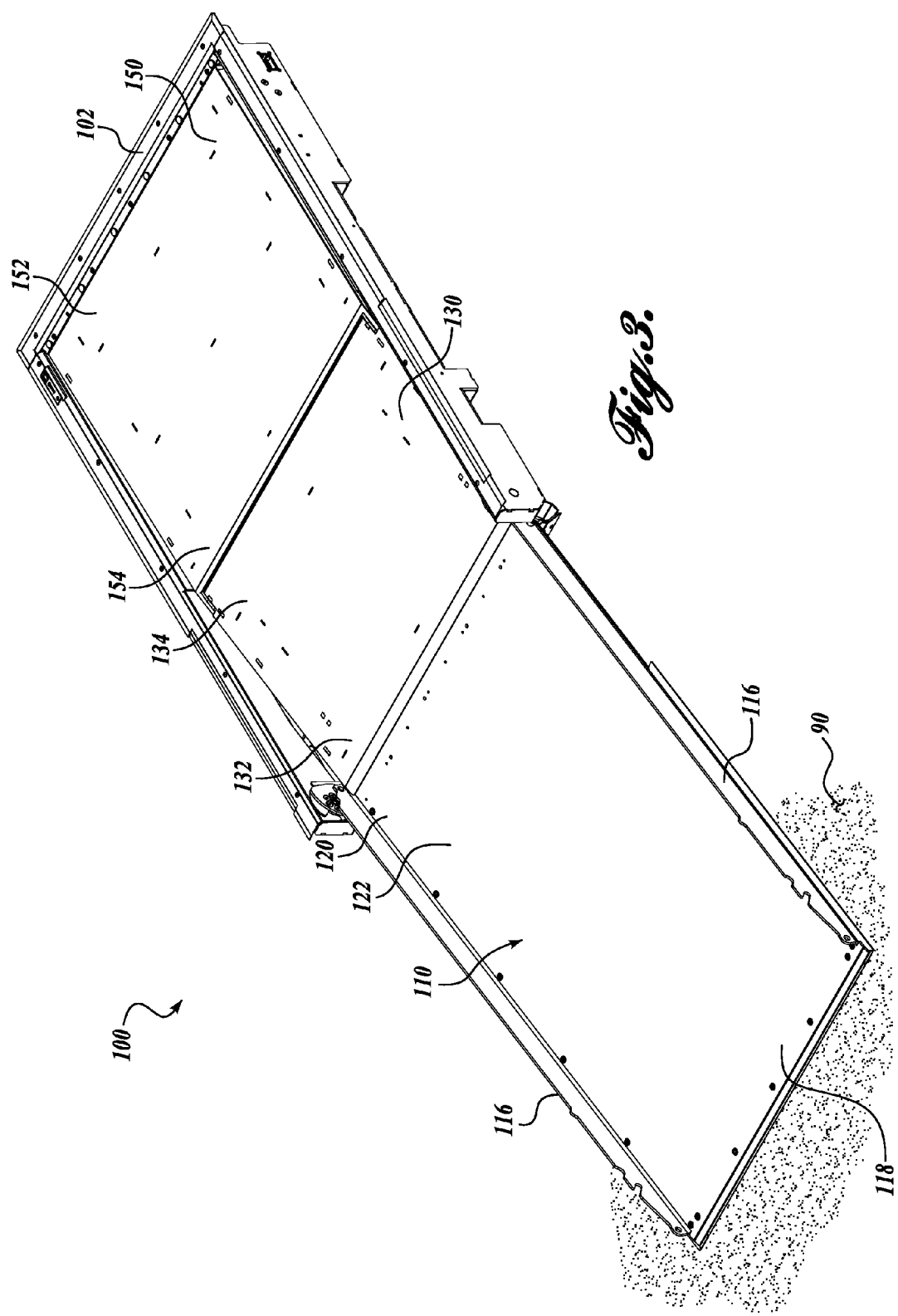
FIG. 3 is an isometric view of the ramp assembly shown in FIG. 1, with the ramp portion in a first deployed position.

Referring to FIG. 1, when the ramp assembly 100 is in the stowed position, the ramp portion 110 extends inwardly such that the ramp is disposed over the intermediate panel 130 and the inner panel 150. When in the stowed position, the lower surface 112 of the ramp panel 114 faces upward and is oriented to be generally flush with the vehicle floor, thereby providing a surface upon which able-bodied passengers can walk while entering and exiting the vehicle. When the ramp portion 110 is in a deployed position, such as the one shown in FIG. 4, the ramp extends in an outward and downward direction so that the upper surface 122 of the panel 114 faces up. When so deployed, the ramp portion 110 cooperates with the intermediate panel 130 and the inner panel 150 to provide an inclined transition surface from the vehicle floor to the alighting surface 90.

Referring to FIGS. 6-13, the roadside end 120 of the ramp portion 110 is connected to a support assembly 300. The illustrated support assembly 300 includes structure to support the ramp portion at the forward end and rear end. In the illustrated embodiment, the forward structure is a mirror image of the rear structure. For the sake of clarity, the rear portion of the support assembly 300 is described herein with the understanding that unless otherwise indicated, each element of the rear portion of the support assembly 300 has a corresponding element on the forward portion of the support assembly 300. It should be appreciated, however, that various embodiments are contemplated in which the forward and rear portions of the support assembly 300 are similar, but not mirror images of each other. In this regard, variations between the forward and rear portions of the support assembly are possible and should be considered within the scope of the present disclosure.

A cam element 330 is fixedly located relative to the frame 102 at the curbside end of the ramp assembly 100, adjacent to the roadside end 120 of the ramp portion 110. In the illustrated embodiment, the cam element 330 is formed from metal sheet or plate and extends upward in a vertical direction from a lower portion of the ramp assembly. A cam surface 334 is formed on the upper end of the cam element 330, and a generally flat, horizontal support surface 332 is formed at the roadside end of the cam surface 334. It will be appreciated that the illustrated cam element 330 is exemplary only and should not be considered limiting. In this regard, embodiments utilizing other suitable materials, shapes, and configurations are contemplated, and such variations should be considered within the scope of the present disclosure.

A support element 310 is rotatably coupled to the frame 102 about an axis 350. A tang extends from a the perimeter of the support element 310 to define a recess 312 in the profile of the support element. In the illustrated embodiment, the support element 310 is formed from metal sheet or plate and is positioned to be generally parallel to the cam element 330. The support element 310 is operably coupled to a drive assembly 230 (described later) that selectively rotates the support element 310 relative to the cam element 330.

The roadside end 120 of the ramp portion 110 is rotatably coupled to the support element 310 about an axis 352 that is parallel to and offset from axis 350. As a result, rotation of the support element 310 about axis 350 moves axis 352 along an arcuate path. This, in turn, moves the roadside end 120 of the ramp portion 110 about an arcuate path.

A bearing element 320 is disposed on the rear surface of the side curb 116 of the ramp portion 110. In the illustrated embodiment, the bearing element 320 is a roller bearing that is rotatably mounted to the ramp portion 110 about an axis 354, wherein the axis is generally parallel to axes 350 and 352. As will be described in detail later, the bearing element is positioned to rollingly engage the support surface 332 and cam surface 334 of the cam element 330 during various portions of the stow/deploy motion of the ramp assembly 100. In addition, the bearing element 320 engages the recess 312 of the support element 310 during a portion of the stow/deploy motion of the ramp assembly 100. In this regard, the bearing element 320 engages various features of the support assembly 300 during the stow/deploy motion in order to control the orientation of the ramp portion 110 relative to the support element 310 when the ramp portion is not in contact with the alighting surface 90.

It will be appreciated that alternative embodiments of the described bearing element 320 are possible. In one embodiment, the bearing element 320 is a pin fixedly attached to the ramp portion to slidingly engage various features of the support assembly 300 during the stow/deploy motion. In another exemplary embodiment, the bearing element 320 is a boss formed in the side curb 116 of the ramp portion. These and other configurations suitable to engage various features of the support assembly 300 to control the orientation of the ramp portion during the stow/deploy motion are contemplated and should be considered within the scope of the present disclosure.

Figure 5:
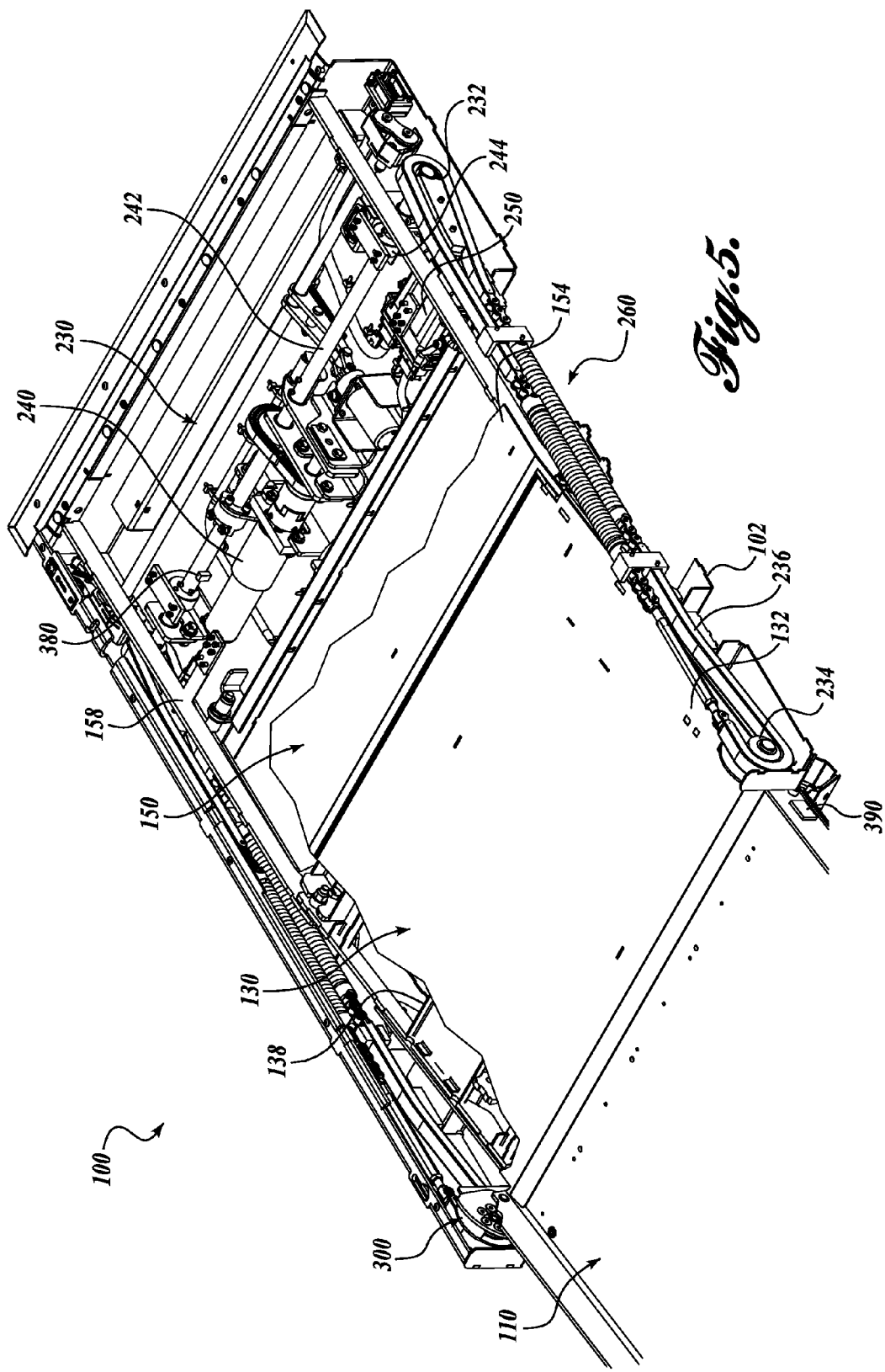
FIG. 5 is a partial isometric view of a drive assembly of the ramp assembly of FIG. 1.

As shown in FIG. 5, the illustrated intermediate panel 130 includes a flat panel element disposed above and coupled to a panel support 138. The panel support 138 provides additional strength and rigidity to the panel. The illustrated embodiment of the intermediate panel 130 is exemplary, and it will be appreciated that alternate configurations of the intermediate panel 130 with different panels and supports are possible and should be considered within the scope of the present disclosure.

Referring to FIGS. 14-17, the roadside end 134 of the intermediate panel 130 is rotatably mounted to the frame 102 about an axis 356. The curbside end 132 of the intermediate panel 130 is supported by a portion of the frame 102 when the ramp assembly 100 is in the stowed position (FIG. 14). More specifically, in the illustrated embodiment, the frame 102 includes a C-channel 104 extending from the forward end of the frame to the rear end of the frame. When the ramp assembly 100 is in the stowed position, the C-channel 104 engages a lower portion of the support panel 138 to support the curbside end 132 of the intermediate panel 130. As the ramp assembly moves from the stowed position to the maximum deployed position (FIG. 17), the curbside end 132 of the intermediate panel 130 is raised to correspond to the roadside end 120 of the ramp portion 110 so that the intermediate panel 130 and the ramp portion 110 cooperate to provide a transition surface between the inner panel 150 and the alighting surface 90.

Referring to FIGS. 14 and 15, as the ramp portion 110 begins to move from the stowed position toward the deployed position, the intermediate panel 130 is supported at the curbside end 132 by the frame 102. As the ramp portion 110 continues to rotate toward the maximum deployed position of FIG. 17, the roadside end 120 of the ramp portion 110 engages the bottom of the curbside end 132 of the intermediate panel 130 so that rotation of the ramp portion raises the curbside end of the intermediate panel. As shown in FIGS. 16 and 17, raising the curbside end 132 of the intermediate panel 130 rotates the intermediate panel about axis 356.

As described in further detail below, the inner panel 150 of the illustrated embodiment is rotatably coupled at the curbside end 154 about axis 356. As a result, throughout the range of deployed positions, the curbside end 132 of the intermediate panel 130 maintains a close proximity to the roadside end 120 of the ramp portion 110, and the roadside end 134 of the intermediate panel maintains a close proximity to the curbside end 154 of the inner panel 150. Because the ends of the intermediate panel are associated with the ramp portion 110 and inner panel 150 in this manner, the intermediate panel provides a suitable transition surface between the ramp portion and the inner panel throughout the range of deployment positions.

As shown in FIGS. 5 and 14-21, the inner panel 150 is configured to reciprocate between a lowered position (FIG. 14), when the ramp assembly 100 is in the stowed position, and a raised position (FIGS. 16-21) when the ramp assembly is in a deployed position. Referring specifically to FIG. 5, the disclosed embodiment of the inner panel is supported by an inner panel support 158 disposed beneath the inner panel. The illustrated embodiment of the inner panel 150 is exemplary, and it will be appreciated that alternate configurations of the inner panel 150 with different panels and supports are possible and should be considered within the scope of the present disclosure.

The inner panel 150 is rotatably coupled at the curbside end 154 to the frame 102 about axis 356. Although the inner panel 150 is shown to be rotatable about the same axis 356 as the intermediate panel 130, the panels may be rotatable about different axes provided that there is a suitable transition between the panels when the ramp assembly 100 is deployed.

The roadside end 152 of the inner panel 150 is supported by a selectively rotatable eccentric bearing element 244. As the eccentric bearing element is selectively rotated about its axis, the roadside end 152 of the inner panel 150 moves between a lowered position and a raised position, thereby rotating the inner panel 150 about axis 356. More specifically, the eccentric bearing selectively rotates the inner panel between a lowered position, when the ramp assembly is in the stowed position (FIG. 14), and a raised position (FIGS. 16-21), when the ramp assembly 100 is in a deployed position.

As illustrated, the inner panel 150 is a rising floor that selectively moves between a lowered position and a raised position as the ramp assembly moves from the stowed position to a deployed position. Other embodiments are contemplated in which other known mechanisms are included to raise and lower the floor. Still other embodiments of the disclosed ramp assembly 100 are possible in which the inner panel 150 does not move during the stow/deploy motion, but instead remains in a fixed position relative to the vehicle floor. These and other embodiments are contemplated and should be considered within the scope of the present disclosure.

Referring back to FIG. 5, the drive assembly 230 actuates the ramp portion 110 to move between the stowed position and a deployed position. More specifically, the drive assembly 230 selectively rotates support element 310 of the support assembly 300 and the eccentric bearing element that supports the inner panel 150 to reciprocate the ramp assembly 100 between the stowed position and the deployed positions. The disclosed drive assembly 230 is similar to the drive assembly disclosed in U.S. Pat. No. 7,681,272, issued to Morris et al., incorporated by reference herein. It will be appreciated that the drive assembly of Morris et al. is only one exemplary drive assembly suitable for use with the presently disclosed ramp assembly, and that any number of other suitable drive assemblies can be utilized in conjunction with or in place of the drive assembly of Morris et al.

Referring to FIG. 5, A forward portion of the drive assembly 230 is located on the forward side of the frame 102, and a rear portion of the drive assembly is similarly located on the rear side of the frame 102, wherein each element of the forward portion of the drive assembly 230 corresponds to a similar element of the rear portion of the drive assembly. For the sake of clarity, the forward portion of the drive assembly 230 is described herein with the understanding that unless otherwise indicated, each element of the forward portion has a corresponding element on the rear portion of the drive assembly 230.

The drive assembly 230 includes a roadside sprocket 232 and a curbside sprocket 234 that are rotatably coupled to the forward side of the frame 102 so that the axes of rotation of the sprockets extend in the forward/rearward direction. A drive chain assembly 236 forms an endless loop that engages the teeth of the curbside sprocket 234 and the teeth of the roadside sprocket 232. As a result, movement of the drive chain assembly 236 along the path of the endless loop rotates the roadside sprocket 232 and the curbside sprocket 234.

A drive shaft 242 is coupled to the roadside sprocket 232, which acts as a drive sprocket, and also to a motor 240 by a well-known transmission assembly. The motor 240 is selectively operated by a controller 250 to rotate the roadside sprocket 232, thereby moving the roadside sprocket 232 and the curbside sprocket 234 via the drive chain assembly 236. In one embodiment, a single motor 240 drives the roadside sprocket of the forward portion of the drive chain assembly and also the roadside sprocket of the rear portion of the drive chain assembly. In another embodiment, each roadside sprocket is driven by a separate motor. In other alternate embodiments, the drive shaft 242 connects the motor 240 to the curbside sprocket or to a separate drive sprocket that engages the drive chain assembly.

The curbside sprocket 234 is operably coupled to the support assembly 300 so that rotation of the drive sprocket rotates the support element 310 of the support assembly 300. In the illustrated embodiment, the curbside sprocket 234 is coupled to the support element 310 so that the roadside sprocket 232 (drive sprocket) rotation is at a 1:1 ratio with the support element 310. It will be appreciated that the drive sprocket can be coupled directly or indirectly to the support element 310, and that various known transmissions can be utilized to create drive sprocket to support element rotation ratios that are greater than or less than 1:1.

In the illustrated embodiment, the eccentric bearing elements that support the roadside end of the inner panel 150 are coupled to the drive shaft 242 so that the inner panel 150 is raised and lowered by the selective rotation of the drive shaft 242.

Referring to FIG. 5, the drive assembly 230 further includes a counterbalance assembly 260. The counterbalance assembly 260 can be any known counterbalance assembly that biases the ramp portion toward the neutral position, i.e., a position wherein the center of gravity of the ramp portion 110 is located above the axis of rotation of the ramp portion so that the center of gravity imparts no moment about the axis of rotation. By biasing the ramp portion 110 toward the neutral position, the counterbalance assembly counteracts some or all of the weight of the ramp, thereby reducing the actuating force required to reciprocate the ramp assembly 100 between the stowed position and the deployed positions. As a result, a smaller motor is required, and wear on the motor is reduced. One exemplary counterbalance suitable for use with the ramp assembly is disclosed in U.S. Pat. No. 7,681,272, issued to Morris et al., previously incorporated by reference herein. It will be appreciated that the counterbalance of Morris et al. is only one exemplary counterbalance suitable for use with the presently disclosed ramp assembly, and that any number of other suitable counterbalance assemblies can by utilized in conjunction with or in place of the counterbalance of Morris et al.

Figure 6:
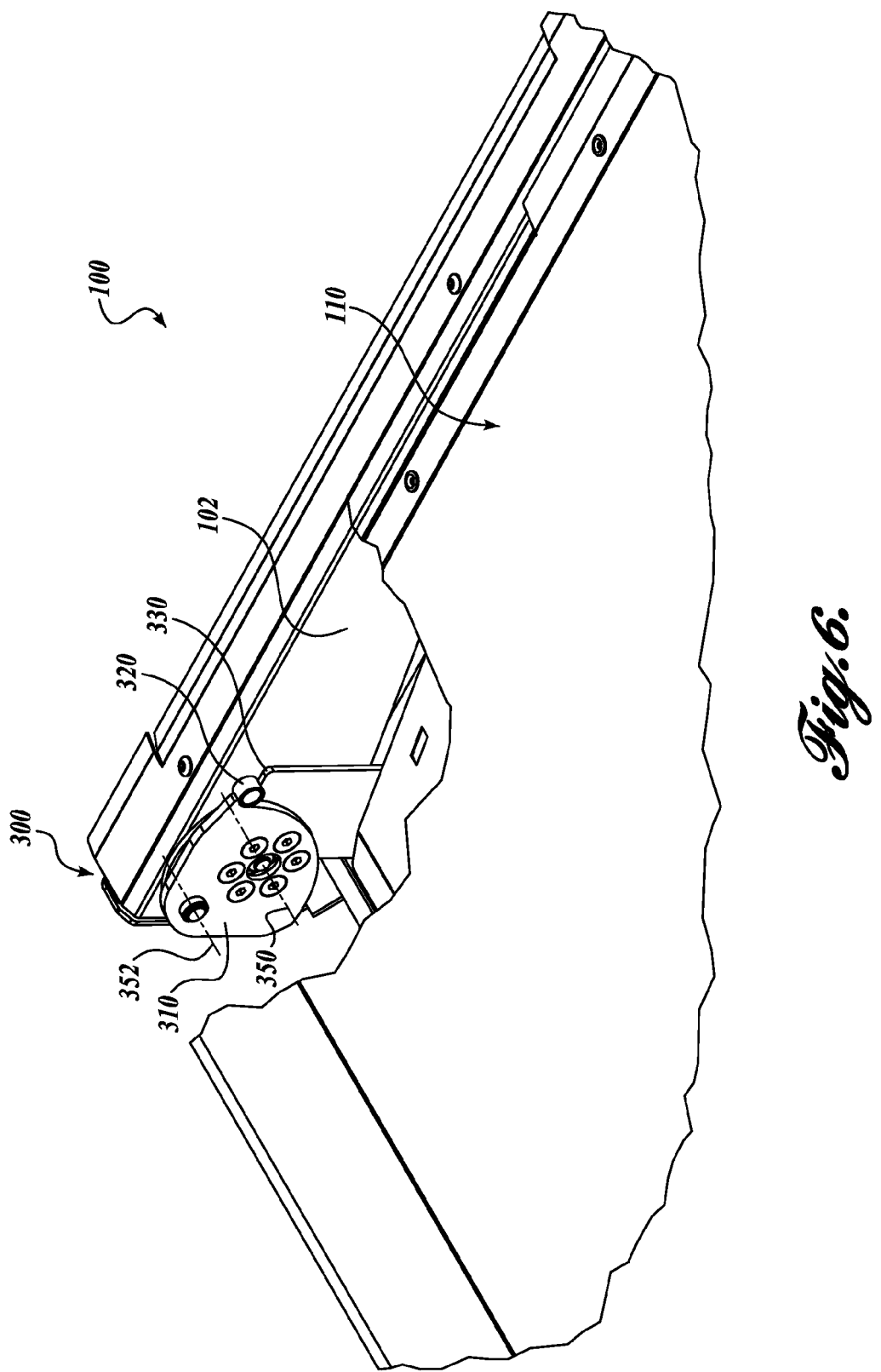
FIG. 6 is a partial isometric view of a support assembly of the ramp assembly of FIG. 1, with the ramp portion in the stowed position.
Figure 10:
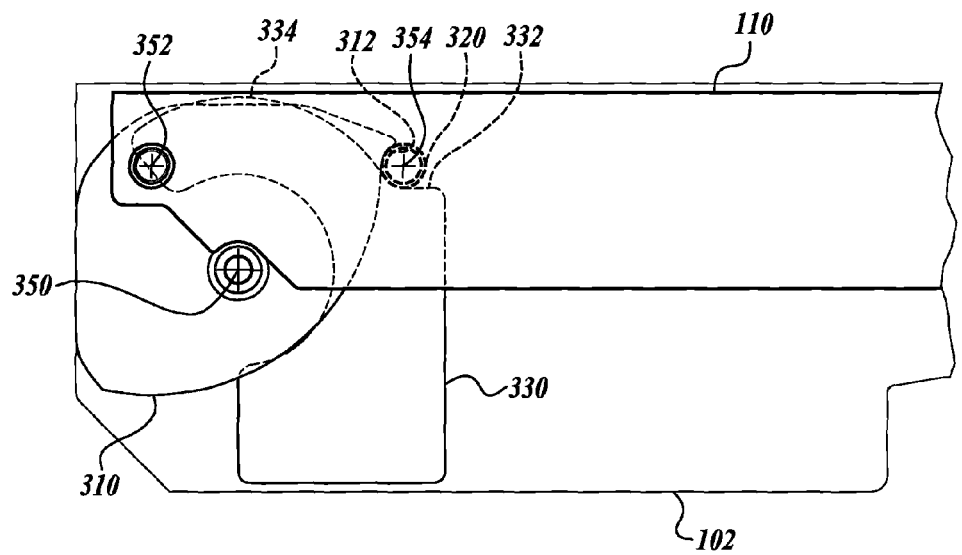
FIG. 10 is a side view of the support assembly of FIG. 6, with the ramp portion in the stowed position.

As previously noted, when the ramp assembly 100 is in the stowed position, the ramp portion 110 extends inwardly from the support assembly 300 such that the ramp is disposed over the intermediate panel 130 and the inner panel 150. When so positioned, axis 352, about which the ramp portion 110 is connected to the support element 310, is in a raised position, as shown in FIGS. 6 and 10. In addition, the bearing element 320 is supportingly engaged by the support surface 332 of the cam element 330. Thus, the support element 310 and the cam element 330 cooperate to support the roadside end 120 of the ramp portion 110.

A first phase of the deployment motion begins as the drive assembly 230 rotates the support element 310 relative to the cam element 330. The rotation of the support element 310 moves axis 352 and, therefore, the roadside end 120 of the ramp portion 110 along an arcuate path. Still referring to FIGS. 6 and 10, the bearing element 320 moves due to the rotation of the ramp portion 110, while engaging the cam surface 334 of the cam element 330. The bearing element 320 follows the cam surface 334, which combined with the downward movement of axis 352, begins to rotate the ramp portion 110 about the support assembly 300. During the first phase, the weight of the ramp portion 110 tends to rotate the ramp portion toward the stowed position. Thus, the bearing element 320 maintains contact with the cam surface 334.

Figure 7:
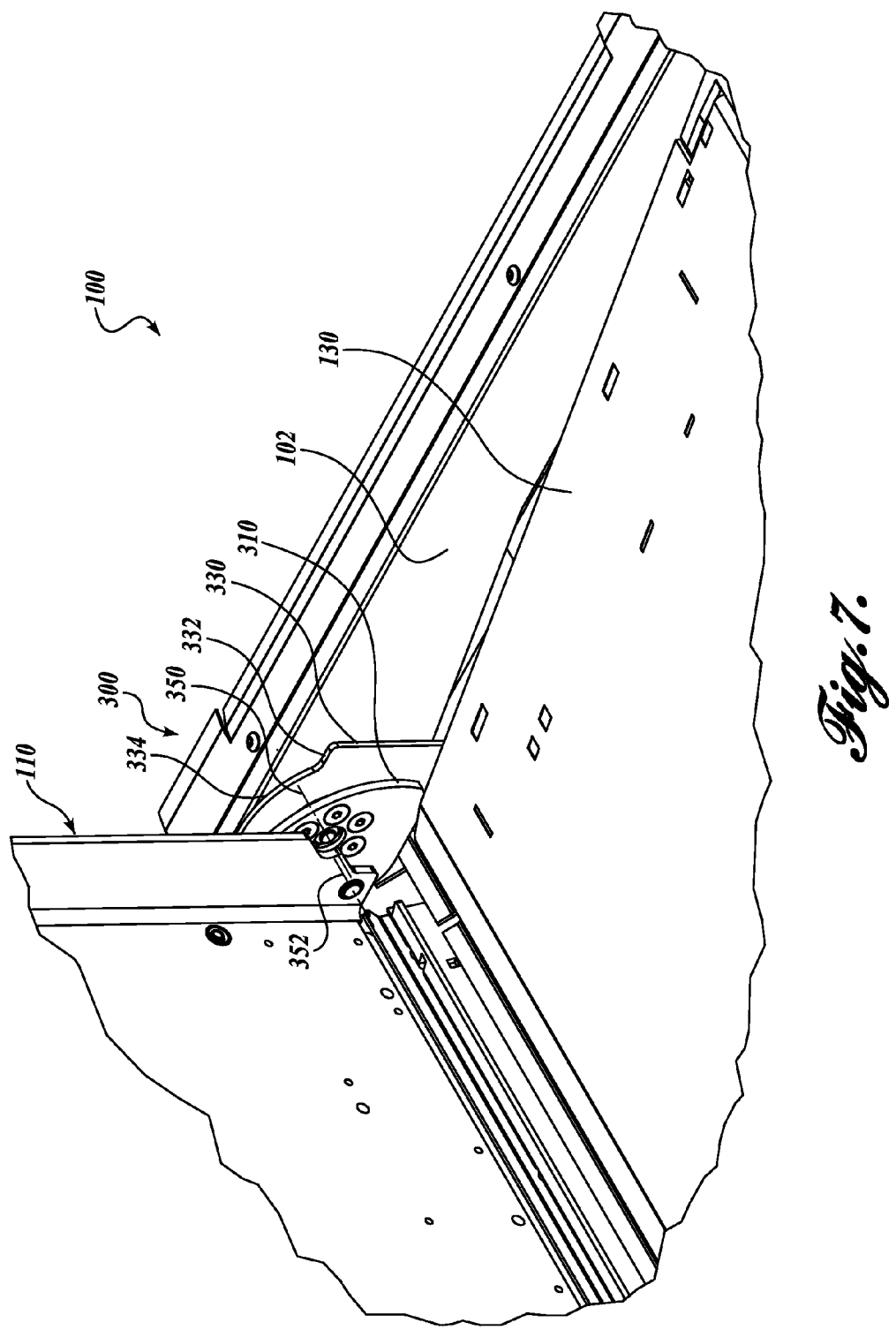
FIG. 7 is a partial isometric view of the support assembly of FIG. 6, with the ramp portion in the neutral position.
Figure 11:
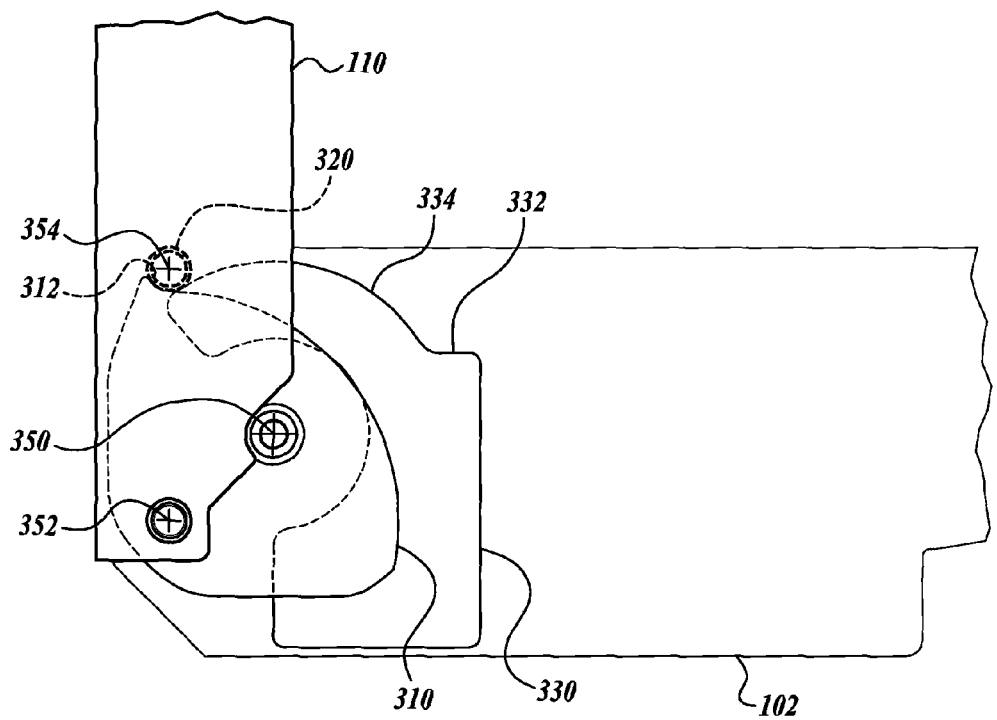
FIG. 11 is a side view of the support assembly of FIG. 10, with the ramp portion in the neutral position.

The first phase of the deployment motion continues until the ramp portion 110 reaches the neutral position shown in FIGS. 7 and 11. In the neutral position, the center of gravity (CG) of the ramp portion 110 is located above the center of rotation of the ramp portion 110 so that the weight of the ramp portion does not impart a moment about axis 352, i.e., the weight of the ramp portion does not tend to rotate the ramp portion toward or away from the stowed position.

Figure 8:
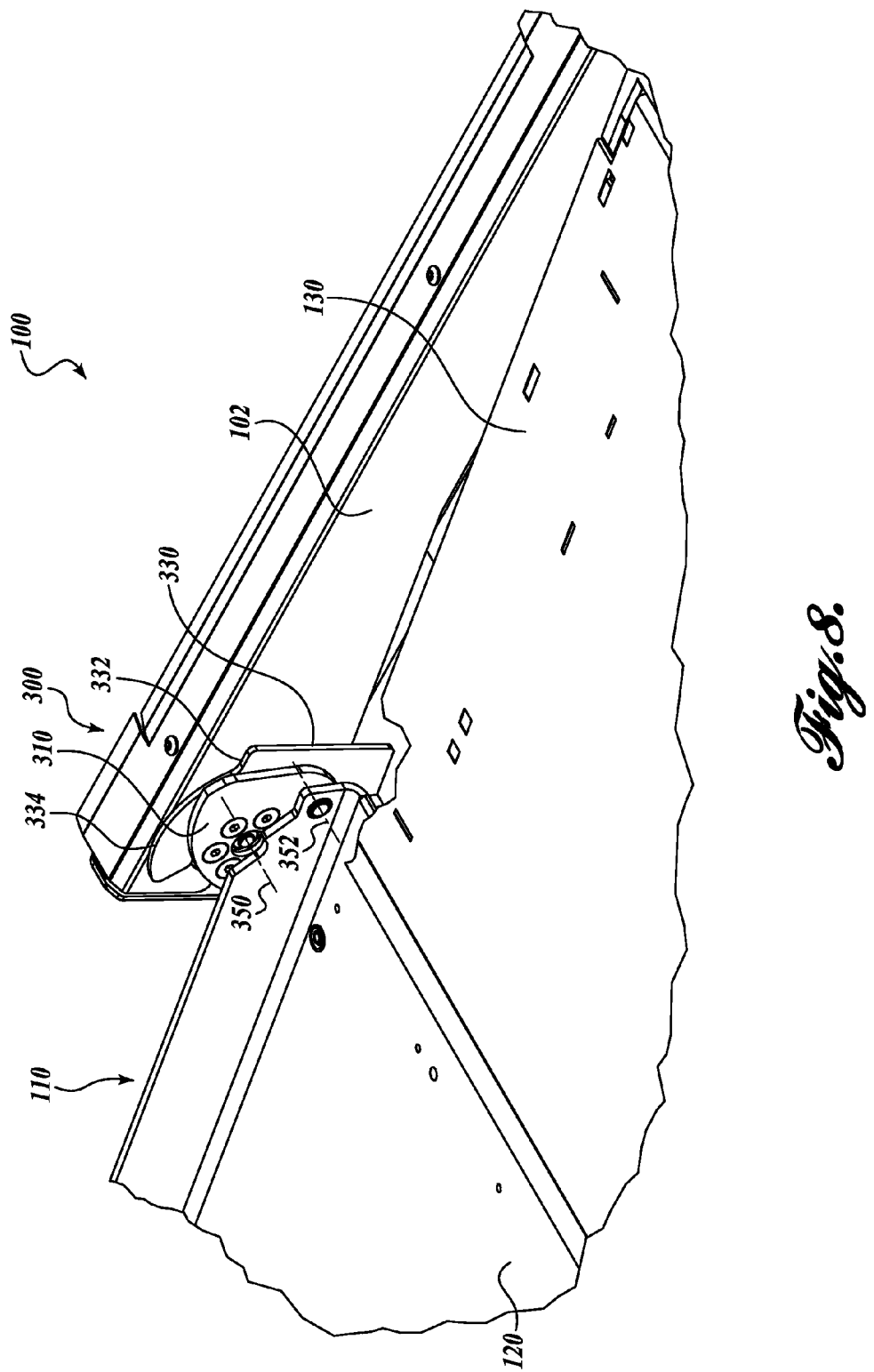
FIG. 8 is a partial isometric view of the support assembly of FIG. 6, with the ramp portion in the first deployed position.
Figure 12:
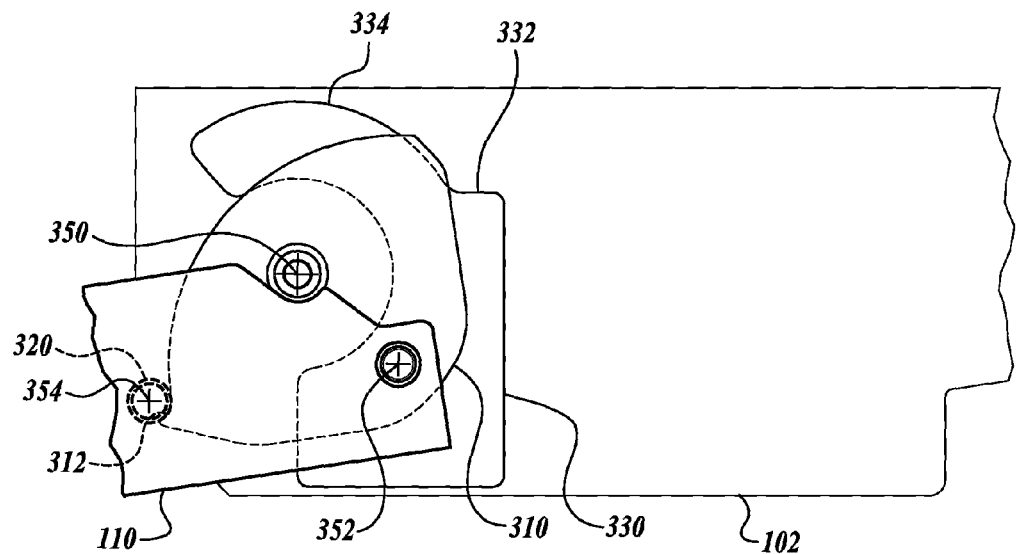
FIG. 12 is a side view of the support assembly of FIG. 10, with the ramp portion in the first deployed position.

During a second phase of the deployment motion, the ramp portion 110 moves from the neutral position of FIGS. 7 and 11 to a first deployed position, shown in FIGS. 8 and 12. Referring to FIG. 12, the support element 310 continues to rotate, thereby continuing movement of the roadside end 120 of the ramp portion 110 along an arcuate path. During the second phase of the deployment motion, the CG of the ramp portion 110 tends to rotate the ramp portion away from the stowed position. As a result, the bearing element 320 is supportingly engaged by the recess 312 formed in the support element 310. In the disclosed embodiment, the bearing element 320 disengages from the cam surface 334, although alternate embodiments are contemplated wherein the bearing element maintains engagement with the cam surface 334 through some or all of the second phase.

The support element 310 supports the bearing element 320 and, therefore, the ramp portion 110 during the second phase to prevent rotation of the ramp portion 110 about axis 352. Thus, the position of the ramp portion 110 is controlled by the rotational connection about axis 352 to the cam element 330 and the engagement of the bearing element 320 with the recess 312 formed in the support element 310. The second phase continues until the curbside end 118 of the ramp portion 110 contacts the alighting surface 90.

Figure 9:
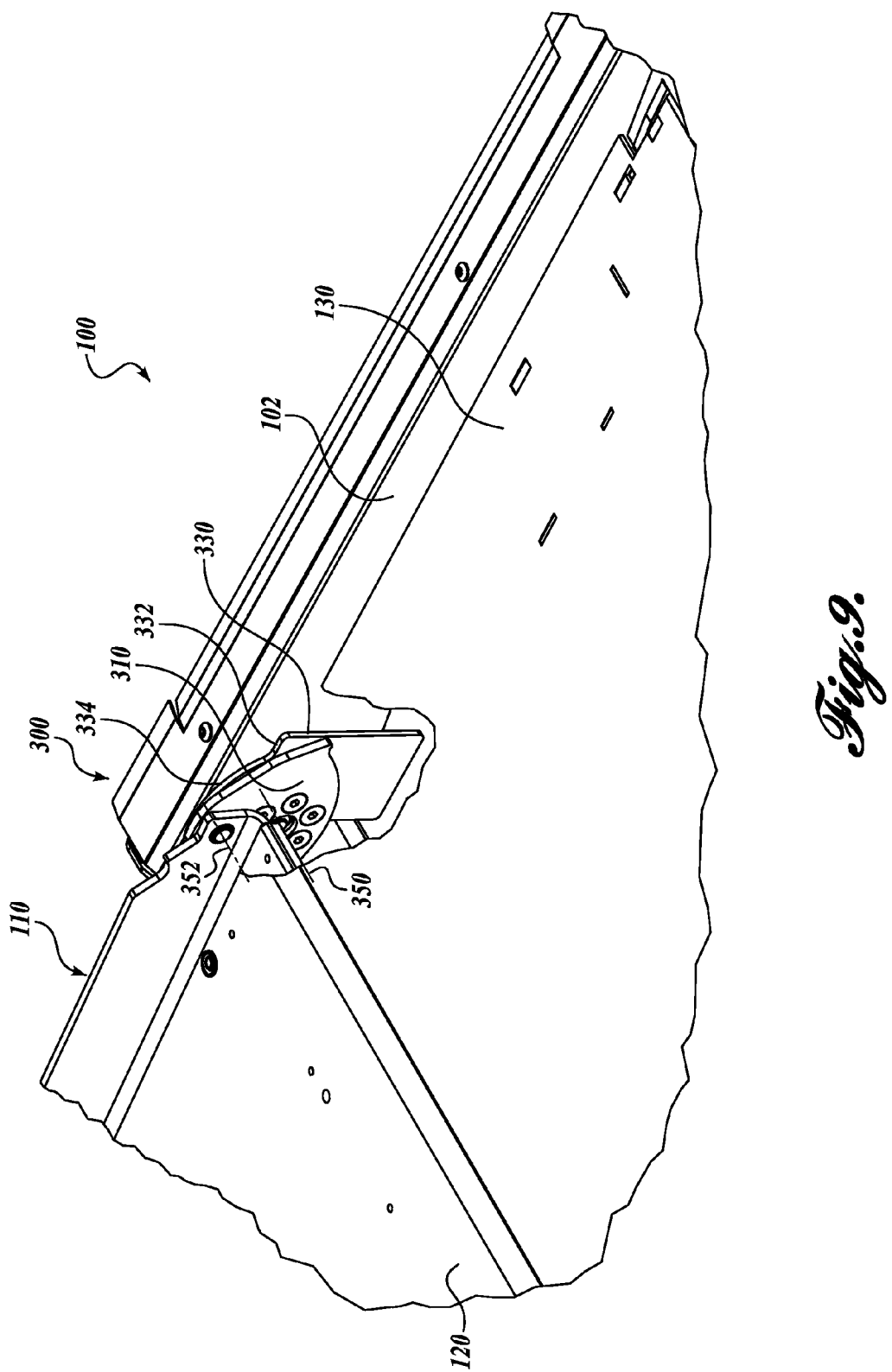
FIG. 9 is a partial isometric view of the support assembly of FIG. 6, with the ramp portion in the second deployed position.
Figure 13:
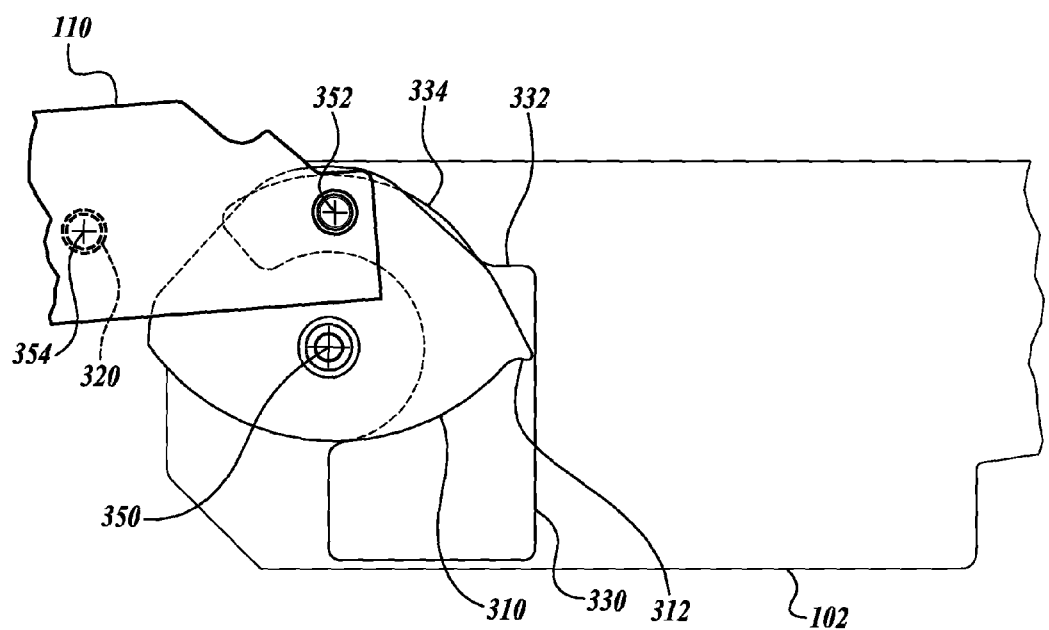
FIG. 13 is a side view of the support assembly of FIG. 10, with the ramp portion in the second deployed position.

A third phase of the deployment motion begins as the ramp portion 110 moves from the position shown in FIGS. 8 and 12, in which the ramp portion 110 has made contact with the alighting surface 90, toward a second deployed position shown in FIGS. 9 and 13, which shows the maximum rotation of the support element 310. Support element 310 continues to rotate, moving the hinged connection of the ramp portion 110 to the support element 310 and, therefore, the roadside end 120 of the ramp portion 110, along the arcuate path. As the roadside end 120 of the ramp portion 110 moves upward along the arcuate path, the curbside end 118 of the ramp portion 110 maintains contact with the alighting surface 90. With the curbside end 118 of the ramp portion 110 supported by the alighting surface 90, and the roadside end 120 of the ramp portion 110 supported by the connection of the ramp portion to the support element 310 about axis 352, rotation of the support element rotates the recess 312 of the support element away from the bearing element 320. Thus, the support element 310 disengages from the bearing element 320.

To move the ramp portion from the maximum deployed position of FIGS. 9 and 13, to the stowed position, the drive assembly 230 rotates the support element 310 in a clockwise direction about axis 350 (as shown in FIG. 13). This rotation moves axis 352 and, therefore, the roadside end 120 of the ramp portion downward along an arcuate path. During the initial rotation, the ramp portion 110 is supported at the roadside end 120 by the rotational connection to the support element 310 and at the curbside end 118 by the alighting surface 90.

As the support element 310 continues to rotate, the recess 312 formed in the support element engages the bearing element 320, as shown in FIG. 12. Further rotation of the support element 310 continues to move the recess 312 so that the engagement of the recess with the bearing element 320 drives the bearing element in a clockwise direction, as shown in FIG. 12. The movement of the bearing element 320 combined with the movement of axis 352 rotates the ramp portion 110 toward the neutral position. Throughout the movement of the ramp portion 110 from FIG. 12 to FIG. 11, the CG of the ramp portion 110 is positioned curbside of axis 352 so that the weight of the ramp provides a moment that tends to maintain engagement of the bearing element 320 with the recess.

As the ramp portion 110 passes through the neutral position of FIG. 11, the CG of the ramp portion moves roadside of axis 352 so that the weight of the ramp portion tends to rotate the ramp portion about axis 352 toward the stowed position. As a result, the bearing element 320 engages the cam surface 334 of the cam element 330. Engagement of the bearing element 320 with the cam surface 334 combines with the connection of the ramp portion 110 to the support element 310 about axis 352 controls the position of the ramp portion as the ramp portion continues to move from the neutral position toward the stowed position.

When the ramp portion 110 reaches the stowed position of FIG. 10, the bearing element 320 contacts the support surface 332 of the cam element 330 so that the support surface supports the ramp portion. As shown in the embodiment of FIG. 10, the recess 312 in the support element 310 also engages the bearing element 320 so that the bearing element is disposed between the recess and the support surface 332. With the support element 310 and the cam element 330 engaging the bearing element 320 in this manner, the ramp portion is secured in the stowed position, and vibration of the ramp portion 110 in the stowed position is reduced.

As previously noted, conditions under which the ramp assembly 100 is deployed affect the slope of the deployed ramp portion 110, as well as the angle of the deployed ramp portion relative to the intermediate panel 130. In addition, the amount of ramp portion 110 rotation necessary to deploy the ramp assembly 100 also affects the angle of the intermediate panel 130 relative to the vehicle floor, potentially creating an undesirable obstacle for passengers entering or leaving the vehicle as they make the turn between the ramp assembly and the vehicle aisle.

Because of the interaction of the roadside end 120 of the ramp portion 110 with the curbside end 132 of the intermediate panel 130, the slope of the deployed ramp portion is related to the angle of the intermediate panel relative to the vehicle floor. In this regard, operating the ramp assembly 100 to minimize the slope of the deployed ramp portion 110 adversely affects, i.e., increases, the angle of the intermediate panel 130 relative to the vehicle floor. Similarly, operating the ramp assembly 100 to minimize the angle of the intermediate panel 130 relative to the vehicle floor increases the slope of the deployed ramp portion 110. Unlike the ramp assembly disclosed in the '544 publication, the presently disclosed ramp assembly 100 is deployable in a manner that accomodates both parameters.

One exemplary method for deploying the ramp assembly 100 minimizes the angle of the intermediate panel 130 relative to the vehicle floor, while limiting the slope of the ramp portion 110. The method includes the step of moving the ramp portion 110 through the first phase, in which the ramp portion 110 moves from the stowed position (FIG. 10) to the neutral position (FIG. 11). As the ramp portion moves through this first phase, the support element 310 rotates axis 352 along an arcuate path, and the bearing element 320 follows the cam surface 334.

The next step of the exemplary method is to move the ramp portion 110 from the neutral position (FIG. 11) to a first deployed position (FIG. 12), in which the ramp portion first contacts the alighting surface. During this second phase, the support element 310 continues to rotate, thereby continuing movement of axis 352 along an arcuate path, while the bearing element 320 is supportively engaged by the recess 312 formed in the support element 310.

The next step of the exemplary method is to continue rotating the support element 310 until the ramp portion 110 reaches a predetermined slope. During this third phase, the curbside end 118 of the ramp portion 110 maintains contact with the alighting surface, while the continued rotation of the support element 310 raises axis 352, thereby increasing the slope of the ramp portion. When the ramp portion 110 has reached the maximum predetermined slope, the intermediate panel 130 is at its minimum angle relative to the vehicle floor for that particular deployment condition.

In the illustrated embodiment, the predetermined slope of the ramp portion is approximately 1:6. It will be appreciated that the 1:6 slope is exemplary, and that the predetermined slope may be greater or less than 1:6. Accordingly, other predetermined slopes, such as 1:8, for example, are contemplated and should be considered within the scope of the present disclosure.

FIGS. 18-21 show the disclosed ramp assembly 100 deployed by the exemplary method under different conditions. Referring to FIG. 18, the ramp assembly 100 is deployed to a 1 inch curb. The ramp portion 110 has a slope of approximately 1:6, and the resulting angle $\theta_1$ between the intermediate panel 130 and the vehicle floor is approximately 6°. Although further rotation would decrease the value of $\theta_1$, such rotation would increase the slope of the ramp portion beyond the predetermined limit of 1:6. When the ramp assembly 100 is deployed in this manner to a 1 inch curb, the angle $\theta_2$ between the ramp portion 110 and the intermediate panel 130 is approximately 182°.

FIG. 19 shows the ramp assembly 100 deployed to a 2 inch curb. The ramp portion 110 has a slope of approximately 1:6, and the resulting angle $\theta_1$ between the intermediate panel 130 and the vehicle floor is approximately 3°. Similar to the deployment shown in FIG. 18, further rotation would decrease the value of $\theta_1$, but would increase the slope of the ramp portion beyond the predetermined limit of 1:6. When the ramp assembly 100 is deployed in this manner to a 2 inch curb, the angle $\theta_2$ between the ramp portion 110 and the intermediate panel 130 is approximately 185°.

Figure 20:
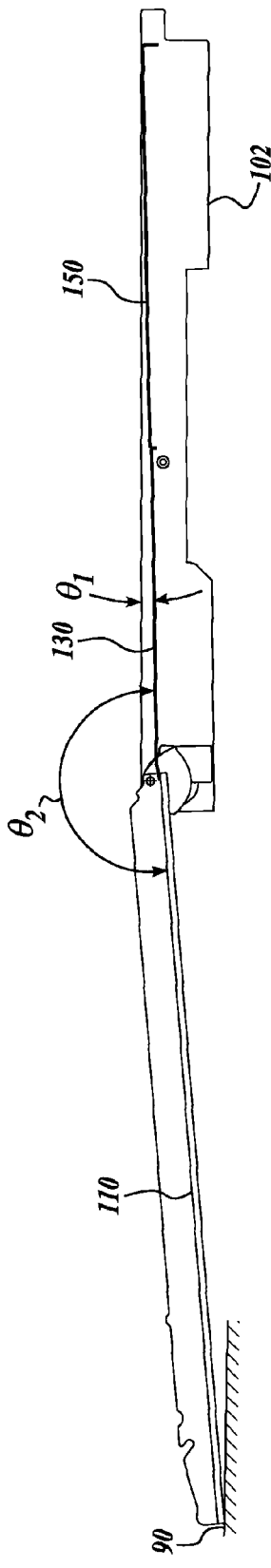
FIG. 20 is a side cross-sectional view of the ramp assembly of FIG. 18, with the ramp portion deployed to a third alighting surface.

FIG. 20 shows the ramp assembly 100 deployed to a 6 inch curb. The ramp portion 110 has a slope of approximately 1:10, and the resulting angle $\theta_1$ between the intermediate panel 130 and the vehicle floor is approximately 1°. In the illustrated position, the roadside end 120 of the ramp portion 110 is at its maximum height. As a result, the slope of the ramp portion 110 is determined by the height of the curb, and the angle $\theta_1$ between the intermediate panel 130 and the vehicle floor is at its minimum. When the ramp assembly 100 is deployed in this manner to a 6 inch curb, the angle $\theta_2$ between the ramp portion 110 and the intermediate panel 130 is approximately 183°.

Figure 21:
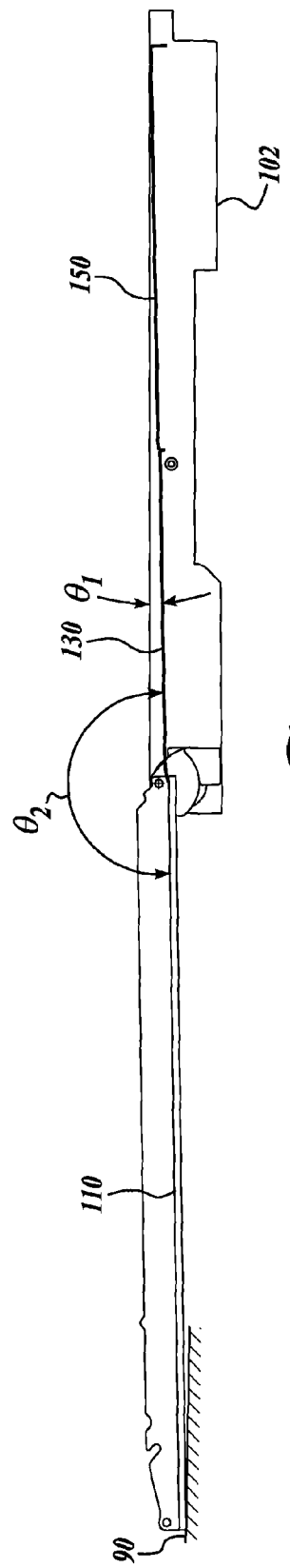
FIG. 21 is a side cross-sectional view of the ramp assembly of FIG. 18, with the ramp portion deployed to a fourth alighting surface.

FIG. 21 shows the ramp assembly 100 deployed to a 9 inch curb. The ramp portion 110 has a slope of approximately 1:30, and the resulting angle $\theta_1$ between the intermediate panel 130 and the vehicle floor is approximately 1°. Similar to the deployment shown in FIG. 20, the roadside end 120 of the ramp portion 110 is at its maximum height such that the slope of the ramp portion 110 is determined by the height of the curb, and the angle $\theta_1$ between the intermediate panel 130 and the vehicle floor is at its minimum. When the ramp assembly 100 is deployed in this manner to a 9" curb, the angle $\theta_2$ between the ramp portion 110 and the intermediate panel 130 is approximately 180°.

In one embodiment of the disclosed method, the deployment of the ramp assembly 100 is controlled by the operator. That is, the operator activates the drive assembly 230 via the controller 250 to deploy ramp assembly 100 until the (1) ramp portion 110 has reached the maximum slope or (2) the angle between the intermediate panel 130 and the vehicle floor is at its minimum, i.e., the roadside end 120 of the ramp portion 110 is at its maximum height.

In a second contemplated embodiment, the controller 250 controls the drive assembly 230 to deploy the ramp assembly 100 according to the disclosed method. The controller 250 is operatively connected to an inclinometer 390 associated with the ramp portion 110 and to a position sensor 380 associated with the support assembly 300. The inclinometer 390 senses the absolute slope of the ramp portion 110, i.e., the angle of the ramp portion relative to a horizontal plane, and sends a signal indicating the angle to the controller 250. It will be appreciated that any sensor suitable for sensing the absolute slope of the ramp portion 110 may be utilized and should be considered within the scope of the present invention.

The sensor 380 associated with the support assembly 300 senses the position of the intermediate panel 130 and sends a signal indicating the position to the controller 250. The sensor 380 can be any known positional sensor suitable for sensing the position of the moving components of the support assembly 300. Alternate embodiments are also contemplated in which the sensor 380 senses rotation of the drive shaft 242 or any other ramp assembly 100 component for which a particular component position corresponds to a particular intermediate panel 130 position. In yet another embodiment, the sensor 380 is a switch that is activated by a ramp assembly 100 component, such as the intermediate panel 130 itself, when the intermediate panel reaches its minimum angle relative to the vehicle floor.

The controller 250 receives signals from the inclinometer 390 and the position sensor 380, and controls the drive assembly 230 to deploy the ramp portion according to the disclosed method. That is, the controller 250 drives the ramp portion 110 through the deployment motion until (1) the ramp portion reaches its predetermined maximum slope, or (2) the angle between the intermediate panel 130 and the vehicle floor is at its minimum.

While illustrative embodiments have been illustrated and described, it will be appreciated that various changes can be made therein without departing from the spirit and scope of the invention.

The invention claimed is:

1. A ramp assembly for providing a transition surface from a vehicle floor to an alighting surface, the ramp assembly comprising:
   (a) a ramp portion coupled for reciprocating movement between a stowed position and a deployed position, the ramp portion comprising a bearing element;
   (b) a support element rotatable about a first axis, the ramp portion being rotatably coupled to the support element about a second axis, rotation of the support element moving the second axis along an arcuate path;
   (c) a cam surface fixedly positioned relative to the stowed position of the ramp portion;
   (d) a panel rotatable about a first end, a second end of the panel being supported by the ramp portion, wherein rotation of the ramp portion toward the deployed position raises the second end of the panel;
   (e) an actuator operably coupled to the support element to rotate the support element about the first axis; and
   (f) a controller programmed to control the actuator to selectively rotate the support element to drive the ramp portion through a first phase, then a second phase, and then a third phase of a deployment motion, wherein:
      (i) the cam surface supportingly engages the bearing element during the first phase;
      (ii) the support element supportingly engages the bearing element during the second phase; and
      (iii) the second axis moves in an upward direction during the third phase until the end of the third phase,
      wherein (1) the controller is programmed to end the third phase when the ramp portion reaches a predetermined maximum slope, and (2) the controller is programmed to end the third phase when the second end of the panel reaches a maximum elevation.

2. The ramp assembly of claim 1, wherein the predetermined maximum slope is 1:6.

3. The ramp assembly of claim 1, wherein the predetermined maximum slope is less than 1:6.

4. The ramp assembly of claim 1, further comprising an inclinometer sensing a slope of the ramp portion, the inclinometer sending a ramp portion signal to the controller to indicate the slope of the ramp portion.

5. The ramp assembly of claim 4, further comprising a position sensor sensing a position of the panel, the position sensor sending a panel signal to the controller to indicate the position of the panel.

6. The ramp assembly of claim 5, wherein the controller controls deployment of the ramp assembly according to the ramp portion signal and the panel signal.

\* \* \* \* \*